(12) United States Patent
Imade

(10) Patent No.: US 7,195,386 B2
(45) Date of Patent: Mar. 27, 2007

(54) LIGHT GUIDING MEMBER, ILLUMINATION APPARATUS, AND PROJECTOR

(75) Inventor: Shinichi Imade, Iruma (JP)

(73) Assignee: Olympus Corporation, Tokyo (JP)

( * ) Notice: Subject to any disclaimer, the term of this patent is extended or adjusted under 35 U.S.C. 154(b) by 92 days.

(21) Appl. No.: 11/176,619

(22) Filed: Jul. 7, 2005

(65) Prior Publication Data

US 2006/0008237 A1    Jan. 12, 2006

(30) Foreign Application Priority Data

Jul. 7, 2004    (JP)    ............................. 2004-200704

(51) Int. Cl.
*F21V 33/00* (2006.01)

(52) U.S. Cl. ...................... 362/551; 362/558; 362/560; 362/561

(58) Field of Classification Search ................ 362/551, 362/552, 558, 560, 561; 385/146
See application file for complete search history.

(56) References Cited

U.S. PATENT DOCUMENTS 4,344,110 A * 8/1982 Ruediger .................... 362/560
5,696,865 A * 12/1997 Beeson et al. .............. 385/146
6,007,225 A * 12/1999 Ramer et al. ............... 362/554

FOREIGN PATENT DOCUMENTS

| JP | 11-352589 | 12/1999 |
|---|---|---|
| JP | 2000-231344 | 8/2000 |

* cited by examiner

*Primary Examiner*—Laura K. Tso
(74) *Attorney, Agent, or Firm*—Volpe & Koenig

(57) ABSTRACT

A light guiding member guides diffusion light using as a central axis a substantial center of the diffusion light emitted from a light source, and comprises a tapered rod and a pipe. The tapered rod comprises an incident end face, an emissive end face having an area larger than that of the incident end face, and a total reflection face which guides at least the diffusion light striking on the incident end face to the emissive end face by inner face reflection. The pipe is disposed in a position which is farther than a distance from the central axis to the total reflection face and comprises a reflection face or a reflection layer which coats the tapered rod.

27 Claims, 10 Drawing Sheets

LIGHT GUIDING MEMBER, ILLUMINATION APPARATUS, AND PROJECTOR

CROSS-REFERENCE TO RELATED APPLICATIONS

This application is based upon and claims the benefit of priority from prior Japanese Patent Application No. 2004-200704, filed Jul. 7, 2004, the entire contents of which are incorporated herein by reference.

BACKGROUND OF THE INVENTION

1. Field of the Invention

The present invention relates to a light guiding member, an illumination apparatus, and a projector.

2. Description of the Related Art

In conventional condensing illumination apparatuses which efficiently illuminate specific areas, such as a car headlight, a stand light, a spotlight, a flashlight, and an illumination unit for a data projector, illumination has heretofore been performed usually with a high condensing performance by a comparatively simple method. In the method, a light emitting source is relatively close to a point light source, light is reflected by a reflection unit whose reflection shape is specially designed, and directivity of beams of the reflected light is enhanced by an optical lens or the like.

There has been a strong demand for enhancement of the condensing performance to obtain brighter illuminative light without excessively enlarging a size of the apparatus itself in the same manner as in general illumination. However, in general, the size tends to increase in order to obtain a brighter illuminative light, but an applied power of the light emitting source needs to be increased to enhance an output. Alternatively, a relatively enlarged reflection unit or an optical lens is applied with respect to the light emitting source in order to improve the condensing performance.

Therefore, to obtain brightness with a good condensing efficiency, the size of an illumination apparatus has to necessarily increase with respect to the light emitting source. In other words, when there is a small-sized light emitting source having a high output, similar to a point light source, the whole illumination apparatus can be miniaturized. From this demand, the miniaturization of the light emitting source is advanced even in a conventional system. Especially, an example of an effective means is a small-sized light emitting source of an electric discharge type, in which a high output is possible. Additionally, even the small-sized electric discharge type light emitting source is required to be driven by a high-voltage power supply, which makes it difficult to reduce a circuit scale. Thus, the illumination apparatus overall has many problems as regards miniaturization, and it is said that the apparatus has almost come close to its limitation.

On the other hand, nowadays, a light emitting diode (hereinafter referred to as an LED) has received much attention as the next-generation small-sized light emitting source. The LED has heretofore had advantages such as a small size, high resistance properties, and long life, but has been applied mainly as indicator illumination for various measuring instruments or a confirmation lamp of a control state due to restrictions of light emitting efficiency and output. However, in recent years, the light emitting efficiency has been rapidly improved, and it is said to be a matter of time before the light emitting efficiency exceeds that of an electric discharge type high-pressure mercury lamp or a fluorescent lamp which has heretofore had the highest efficiency. Due to the development of the high-efficiency high-luminance LED, applications therefore have rapidly increased. In recent years, a blue LED has been brought into a practical use stage in addition to conventional red and green LEDs, and this accelerates the number of applications. In fact, by the use of a plurality of high-efficiency high-luminance LEDs, actual utilization for traffic signals, outdoor large-sized full color displays, various lamps for automobiles, and a backlight for liquid crystal displays of cellular phones has been realized, whereas this has heretofore been impossible in respect of the brightness or efficiency.

There is also an example in which, due to the superior qualities of the LED, the LED is applied as the illumination apparatus for a projector display apparatus. A plurality of LEDs are constituted, accordingly a quantity of light is secured, some light beams are condensed from individual light emitting sources by an optical device such as an optical lens, and the light beams are controlled in such a manner that an irradiating light modulation device provides an allowable incident angle. As devices for converting the light in such a manner as to reduce the NA, and obtaining light having so-called high parallelism, there are Jpn. Pat. No. 3048353, Jpn. Pat. Appln. KOKAI Publication No. 2000-231344 and the like. In the light modulation device like a generally used liquid crystal device, since the allowable incident angle of the illuminative light is very small, it is supposed as ideal to form irradiation light beams having not only good condensing performance but also higher parallelism. This is a very important point for enhancing light use efficiency in the light modulation device.

BRIEF SUMMARY OF THE INVENTION

According to a first invention, there is provided a light guiding member which guides diffusion light using as a central axis a substantial center of the diffusion light emitted from a light source, the member comprising: a tapered rod comprising an incident end face, an emissive end face having an area larger than that of the incident end face, and a total reflection face which guides at least the diffusion light striking on the incident end face to the emissive end face by inner face reflection; and a pipe disposed in a position which is farther than a distance from the central axis to the total reflection face and comprising a reflection face or a reflection layer which coats the tapered rod.

Moreover, in a second invention relating to the first invention, the pipe is preferably a tapered pipe comprising a mirror reflection face which coats the tapered rod and having a distance from the mirror reflection face to the central axis, which is longer on an emissive end face side than on an incident end face side of the tapered rod, a gradient angle $\tau_1$ of the mirror reflection face with respect to the central axis is smaller than a gradient angle $\tau_2$ of the total reflection face with respect to the central axis, and the gradient angles $\tau_1$, $\tau_2$ indicate positive values.

Furthermore, in a third invention relating to the first invention, a refractive index $n_g$ of a medium of the tapered rod is larger than a refractive index $n_a$ of a medium of a gap between the pipe and the tapered rod.

Additionally, in a fourth invention relating to the first invention, a medium of the tapered rod is preferably glass, and a medium of a gap between the pipe and the tapered rod is air.

Moreover, in a fifth invention relating to the first invention, a medium of the tapered rod is preferably plastic, and a medium of a gap between the pipe and the tapered rod is air.

Furthermore, in a sixth invention relating to the second invention, preferably the distance from the central axis to the total reflection face is substantially equal to that from the central axis to the mirror reflection face at an emissive end face portion of the tapered rod.

Additionally, in a seventh invention relating to the sixth invention, the tapered pipe and the tapered rod are preferably held by an adhesive which bonds the mirror reflection face and a back face of the total reflection face in the emissive end face portion of the tapered rod.

Moreover, in an eighth invention relating to the first invention, the reflection face or the reflection layer of the pipe is constituted to cover at least an incident end face portion periphery of the tapered rod.

Furthermore, in a ninth invention relating to the first invention, a length of the pipe in a direction of the central axis is longer than that of the tapered rod in the central axis direction.

Additionally, in a tenth invention relating to the second invention, values are preferably set to the gradient angle $\tau_1$ of the mirror reflection face with respect to the central axis, the gradient angle $\tau_2$ of the total reflection face with respect to the central axis, a maximum diffusion angle $\alpha$ from the central axis at a time when emitting from the light source the diffusion light guided to the emissive end face, and an area $S_i$ of the incident end face of the tapered rod in such a manner as to satisfy a demanded value of the maximum diffusion angle $\alpha$ from the central axis of the diffusion light emitted from the emissive end face of the tapered rod, and a demanded value of an area $S_o$ of the emissive end face of the tapered rod.

Moreover, in an eleventh invention relating to the tenth invention, during the above-described setting, the respective values are preferably set in such a manner as to satisfy the following condition formulas:

$$\sin^{-1}\{(n_d/n_g)\cos(-\alpha+2\tau_1-\tau_2)\}+2\tau_2 > \theta_0; \text{ and}$$

$$\theta_0 = \sin^{-1}(n_d/n_g),$$

where $n_d < n_g$, $0 < \alpha$, $\tau_1$, $\tau_2 < \pi/2$, $\tau_1 < \tau_2$, and $\theta_0$ denotes a critical angle.

Furthermore, a twelfth invention relating to the tenth invention preferably further comprises: a mirror reflection face having a gradient angle $\tau_0$ larger than the gradient angle $\tau_1$ only in a region which the diffusion light enters that has been emitted from the light source at the maximum diffusion angle $\alpha$ from the central axis.

Additionally, in a thirteenth invention, there is provided an illumination apparatus using the light guiding member according to the first invention, the apparatus preferably comprising: a light source which emits diffusion light striking on at least the incident end face of the tapered rod; and holding means for fixing the light source with respect to the tapered rod and/or the pipe.

Moreover, in a fourteenth invention, there is provided an illumination apparatus using the light guiding member according to the first invention, the apparatus preferably comprising: a light source which emits diffusion light striking on at least the incident end face of the tapered rod; and holding means for fixing the light source with respect to the pipe, the pipe being constituted as a reflector of the light source.

Furthermore, in a fifteenth invention relating to the thirteenth or fourteenth invention, the light source is preferably a light emitting element of an LED.

Additionally, in a sixteenth invention relating to the first invention, the diffusion light inner-face reflected by the total reflection face of the tapered rod and guided to the emissive end face preferably includes not only the diffusion light which has exited from the light source and which has thereafter directly entered the tapered rod but also the diffusion light which has exited from the light source and which has thereafter been reflected by the mirror reflection face and which has entered the tapered rod.

Moreover, in a seventeenth invention relating to the first invention, the diffusion light inner-face reflected by the total reflection face of the tapered rod and guided to the emissive end face preferably includes not only the diffusion light which has exited from the light source and which has entered the incident end face but also the diffusion light which has exited from the light source and which has entered the tapered rod from a side face of the tapered rod.

Furthermore, in an eighteenth invention relating to the second invention, in the reflection face or the reflection layer of the pipe, the gradient angle $\tau_1$ of the reflection face or the reflection layer is preferably set in such a manner that reflected light obtained by reflecting the diffusion light emitted by the light source strikes on the incident end face and/or the side face of the tapered rod at an angle at which the reflected light is reflected by the inner face of the tapered rod and guided to the emissive end face.

Additionally, in a nineteenth invention relating to the first invention, as to the reflection face or the reflection layer of the pipe, which reflects the reflected light striking on the side face of the tapered rod, the gradient angle $\tau_1$ of the reflection face with respect to the central axis indicates a negative value in such a manner as to inhibit Fresnel reflection on the side face.

Moreover, in a twentieth invention, there is provided an illumination apparatus comprising: a light source section which emits diffusion light; a tapered rod which guides the diffusion light using as a central axis a substantial center of the diffusion light emitted by the light source section; and a pipe comprising a reflection face or a reflection layer which coats the tapered rod, the tapered rod comprising: an incident end face on which the diffusion light emitted by the light source strikes; an emissive end face having an area larger than that of the incident end face; and a total reflection face which guides at least the diffusion light striking on the incident end face to the emissive end face by inner face reflection, the pipe comprising: the reflection face or the reflection layer disposed in a position which is farther than a distance from the central axis to the total reflection face, the light source section comprising: a light emitting element which emits the diffusion light; and a light guiding element which guides the diffusion light emitted by the light emitting element to at least the incident end face.

Furthermore, in a twenty-first invention relating to the twentieth invention, a refractive index of a medium constituting the light guiding element is preferably substantially equal to that of a medium constituting the tapered rod.

Additionally, in a twenty-second invention relating to the twentieth invention, a material constituting the light guiding element is preferably a silicon-based transparent resin.

Moreover, in a twenty-third invention relating to the twentieth invention, a material constituting the light guiding element is preferably an epoxy-based transparent resin.

Furthermore, according to a twenty-fourth invention, there is provided a projector using the illumination apparatus according to any one of the thirteenth, fourteenth, and twentieth inventions, preferably further comprising: space modulating means for modulating illuminative light which has exited from the emissive end face of the tapered rod in accordance with input video information; and optical projecting means for projecting the illuminative light modulated by the space modulating means.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figures 1A, 1B:
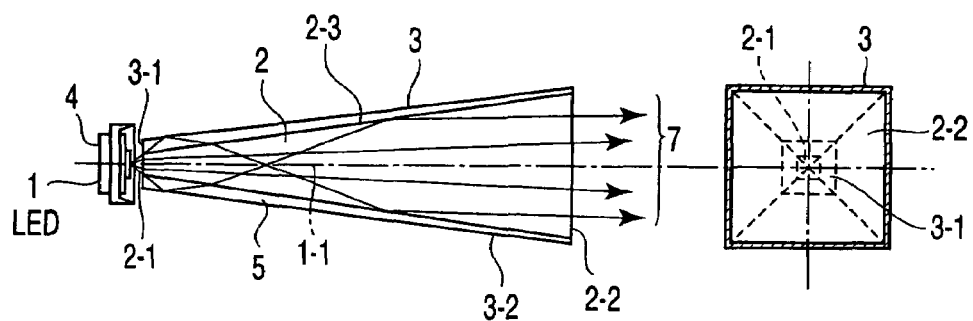
FIGS. 1A, 1B are diagrams showing a first constitution example of an optical NA conversion device which is a light guiding member of the present invention.

An embodiment of the present invention will be described hereinafter in detail with reference to the drawings. FIGS. 1A, 1B are diagrams showing a first constitution example of an optical NA conversion device which is a light guiding member of the present invention. Here, the optical NA conversion device is a double tapered device comprising: a tapered pipe 3 which guides diffusion light 7 using as a central axis 1-1 a substantial center of the diffusion light 7 emitted by a light source (LED) 1 which is a light emitting element disposed on a base block 4 and whose inner face is formed in such a manner as to perform mirror-face reflection; and a tapered rod 2 which is disposed inside the tapered pipe 3 and whose total face is AR coated. Reference numeral 5 denotes a gap between the tapered rod 2 and the tapered pipe 3.

The tapered rod 2 comprises: an incident end face 2-1 directed on an LED 1 side and having an area $S_i$; an emissive end face 2-2 having an area $S_o$ which is larger than the area $S_i$ of the incident end face 2-1; and a side face (total reflection face) 2-3 which guides at least the diffusion light 7 striking on the incident end face 2-1 to the emissive end face 2-2 by the inner-face reflection.

The tapered pipe 3 comprises: an incident end face 3-1; and a mirror reflection face 3-2 or a reflection layer disposed in a position which is farther from a distance from the central axis 1-1 to the total reflection face 2-3, that is, outside the tapered rod 2 to coat the tapered rod 2. A distance from the incident end face 3-1 of the tapered pipe 3 to the central axis 1-1 is longer on an emissive end face 2-2 side rather than on an incident end face 2-1 side of the tapered rod 2. It is to be noted that reference numeral 6 denotes a lens.

Moreover, in a periphery of the emissive end face 2-2 of the tapered rod 2, a distance from the central axis 1-1 to the total reflection face 2-3 is substantially equal to that from the central axis 1-1 to the mirror reflection face 3-2.

According to the constitution, most of the diffusion light 7 emitted from the LED 1 enters the tapered rod 2 via the incident end face 2-1, and the other part of the diffusion light 7 is reflected by the mirror reflection face 3-2 of the tapered pipe 3, and thereafter enters the tapered rod 2 via a side face of the tapered rod 2. Therefore, increased emission can be effectively obtained from the diffusion light, the obtained light is further effectively NA-converted, and bright illuminative light can be obtained having high parallelism.

Figure 2:
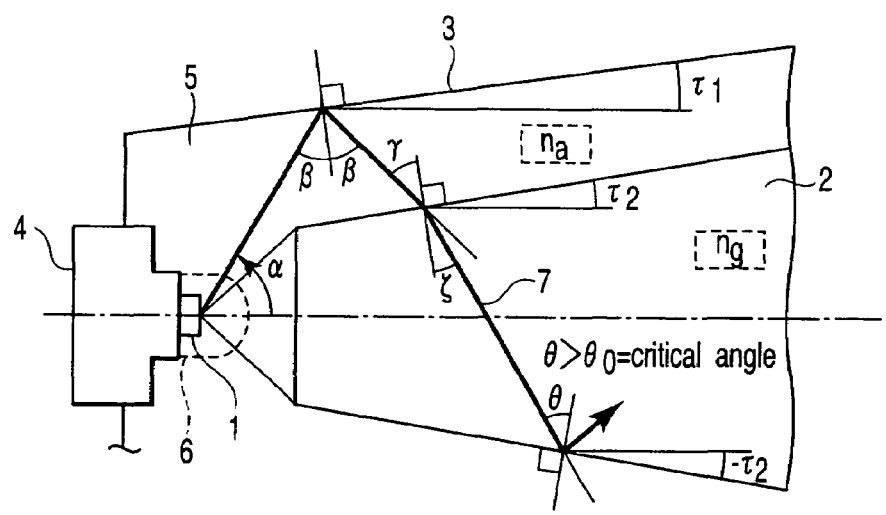
FIG. 2 is an explanatory view showing setting conditions of a taper gradient.

Setting conditions of a taper gradient will be described hereinafter with reference to FIG. 2. FIG. 2 is slightly different from FIGS. 1A, 1B in a positional relation between the tapered pipe 3 and the LED 1, but this difference does not affect the description.

Here, as shown in FIG. 2, the diffusion light 7 is emitted from the LED 1 to the gap 5 of a medium (air in the present embodiment) having an absolute refractive index $n_a$ at a maximum diffusion angle $\alpha$ with respect to the central axis 1-1. The light strikes on the side face of the tapered pipe 3, and is reflected at a reflection angle $\beta$. Thereafter, the light strikes on the side face of the tapered rod 2 at an incident angle $\gamma$, and enters, at a refraction angle $\xi$, the rod in which a medium (glass in the present embodiment) has an absolute refractive index $n_g$. Thereafter, the light strokes on the other side face of the tapered rod 2 at an incident angle $\theta$, and is thereafter reflected. Here, $\tau_1$ denotes a gradient angle of the tapered pipe 3 with respect to the central axis 1-1, and $\tau_2$ denotes a gradient angle of the tapered rod 2 with respect to the central axis 1-1. The angles are determined by a relation with respect to α. Here, $\tau_1$, $\tau_2$ indicate positive values, and $\tau_1 < \tau_2$. Moreover, $n_a < n_g$. For example, $n_a = 1$ (air), and $n_g = 1.5$ (glass). Moreover, $\theta_0$ denotes a critical angle which satisfies total reflection conditions determined by the refractive index of the medium inside the rod, and $\theta > \theta_0$ has to be established. The medium inside the rod may be plastic. Furthermore, $0 < \alpha, \beta, \gamma, \xi, \theta, \tau_1, \tau_2 < \pi/2$.

From FIG. 2, the followings are derived:

$$\beta = (\pi/2 - \alpha) + \tau_1 \quad (1);$$

$$\gamma = \beta + \tau_1 - \tau_2 \quad (2); \text{ and}$$

$$n_a \cdot \sin \gamma = n_g \cdot \sin \xi \quad (3).$$

From the above equations (1) to (3), the following is established:

$$\xi = \sin^{-1}\{(n_a/n_g)\cos(-\alpha + 2\tau_1 - \tau_2)\} \quad (4).$$

$$\theta = \xi + 2\tau_2 > \theta_0 \quad (5),$$

but ξ obtained by the equation (4) is substituted into the equation (5), then the following results:

$$\theta = \sin^{-1}\{(n_a/n_g)\cos(-\alpha + 2\tau_1 - \tau_2)\} + 2\tau_2 > \theta_0 \quad (6).$$

To reflect totally a light ray which has entered the tapered rod 2 and allow the ray to reach the emissive face, taper gradients $\tau_1$, $\tau_2$ have to be determined in such a manner as to satisfy the relation of the equation (6).

Moreover, $$n_g \cdot \sin \theta_0 = n_a \quad (7)$$

is established.

Accordingly, $$\theta_0 = \sin^{-1}(n_a/n_g) \quad (8)$$

results.

It has been found that the critical angle $\theta_0$ indicates a value determined by the absolute refractive indexes $n_a$, $n_g$ of two mediums.

Figure 3:
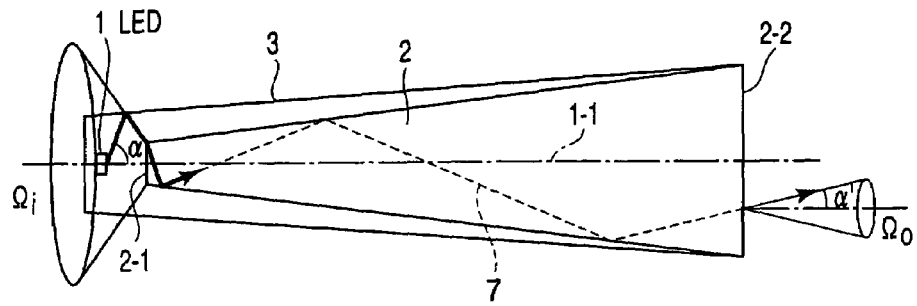
FIG. 3 is an explanatory view showing setting of a taper gradient.

A setting procedure of the taper gradient will be described hereinafter. Here, a case is assumed where the diffusion light emitted from the LED travels in accordance with a light path shown in FIG. 3. That is, the diffusion light 7 from the LED 1 is emitted at the maximum diffusion angle α with respect to the central axis 1-1, reflected by the side face of the tapered pipe 3, and enters the tapered rod 2 at a solid angle $\Omega_i$. Thereafter, the light is totally reflected while traveling, and is finally emitted from the emissive end face 2-2 at α' (solid angle $\Omega_o$) with respect to the central axis 1-1.

Figure 4:
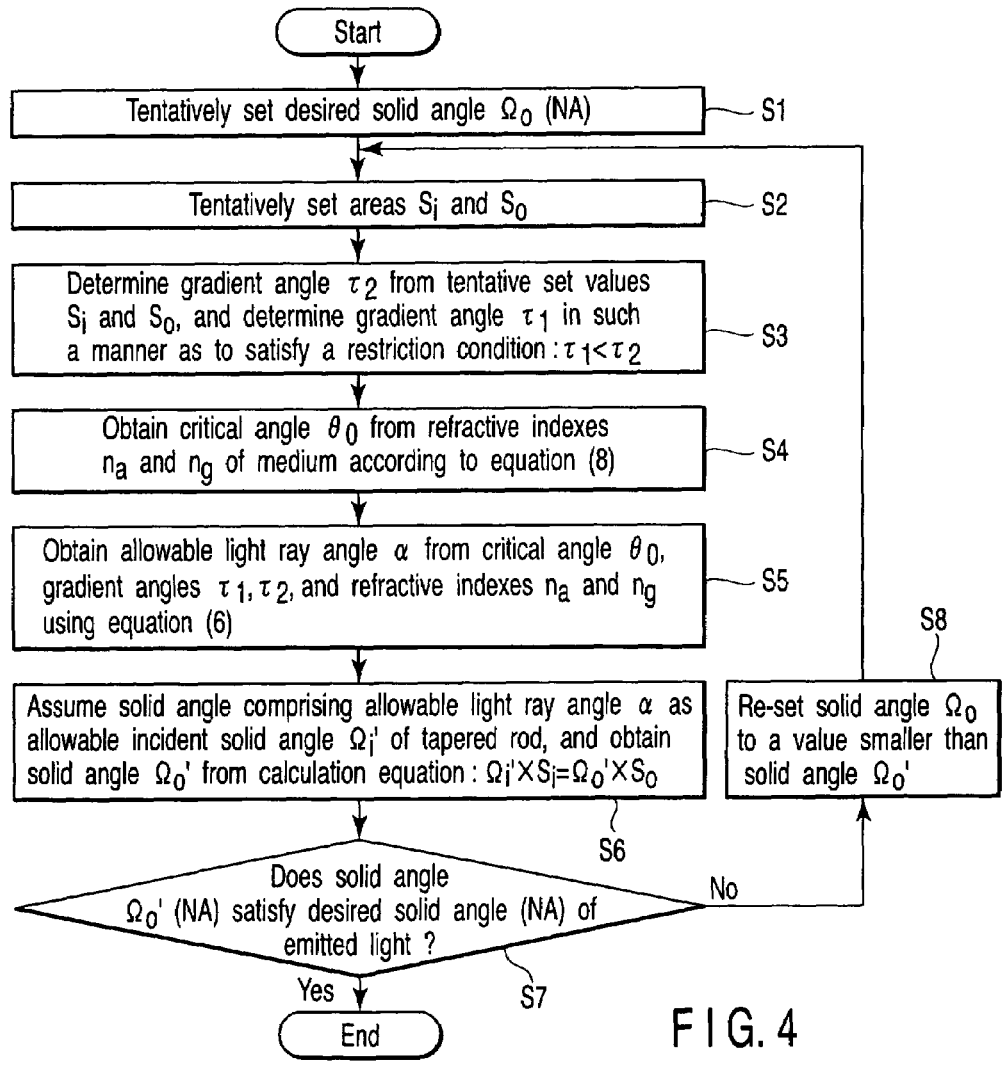
FIG. 4 is a flowchart showing a setting procedure of each parameter.

A setting procedure of each parameter will be described hereinafter with reference to FIG. 4. Here, first the solid angle $\Omega_0$ (NA), and each parameter is obtained based on this angle. First, a desired solid angle $\Omega_0$ (NA) is tentatively set (step S1) Subsequently, the area $S_i$ of the incident end face 2-1 of the tapered rod 2 is tentatively set, and the area $S_o$ of the emissive end face 2-2 is also tentatively set (step S2). Next, the gradient angle $\tau_2$ is determined from the areas $S_i$ and $S_o$ having tentative set values, and the gradient angle $\tau_1$ is determined in such a manner as to satisfy a restriction condition $\tau_1 < \tau_2$ (step S3). Next, the critical angle $\theta_0$ is obtained from a medium $n_g$ of the tapered rod 2, and a medium $n_a$ of the gap 5 between the tapered rod 2 and the tapered pipe 3 using the equation (8) (step S4).

Next, an allowable light ray angle (maximum diffusion angle) α is obtained from the critical angle $\theta_0$, gradient angles $\tau_1$, $\tau_2$, and refractive indexes $n_a$, $n_g$ using the equation (6) (step S5). Next, a solid angle comprising the obtained allowable light ray angle α as an allowable incident solid angle $\Omega_i'$ of the tapered rod 2, and a solid angle $\Omega_o'$ is obtained from calculation equation: $\Omega_i' \times S_i = \Omega_o' \times S_o$ (step S6). Next, it is judged whether or not the solid angle $\Omega_o'$ (NA) satisfies a desired solid angle (NA) of the emitted light (step S7). If NO, the solid angle $\Omega_o$ is set again to a value smaller than the solid angle $\Omega_o'$. Thereafter, the process returns to the step S2 to repeat the above-described steps. Moreover, if the judgment of the step S7 results in YES, the process ends.

Figure 5:
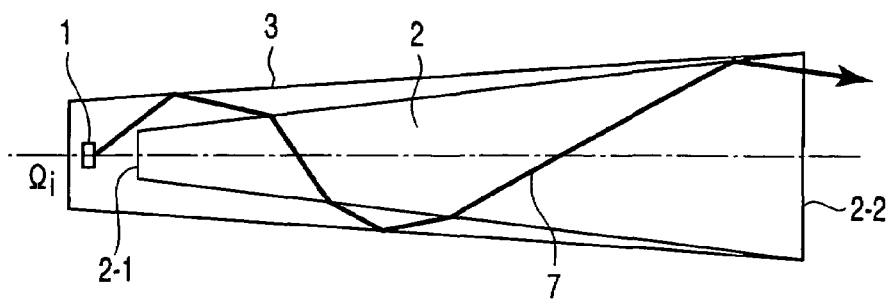
FIG. 5 is a diagram showing a light ray path except a basic light path of the optical NA conversion device.

FIG. 5 is a diagram showing a modification of a light path of a light ray emitted from the LED. In this modification, of the diffusion light emitted from the LED 1, the diffusion light reflected by the tapered pipe 3 once passes through the tapered rod 2, and is again reflected by the tapered pipe 3. This diffusion light strikes on the tapered rod 2 again, and is thereafter totally reflected in the tapered rod 2. The light exits from the emissive end face 2-2.

Figure 6:
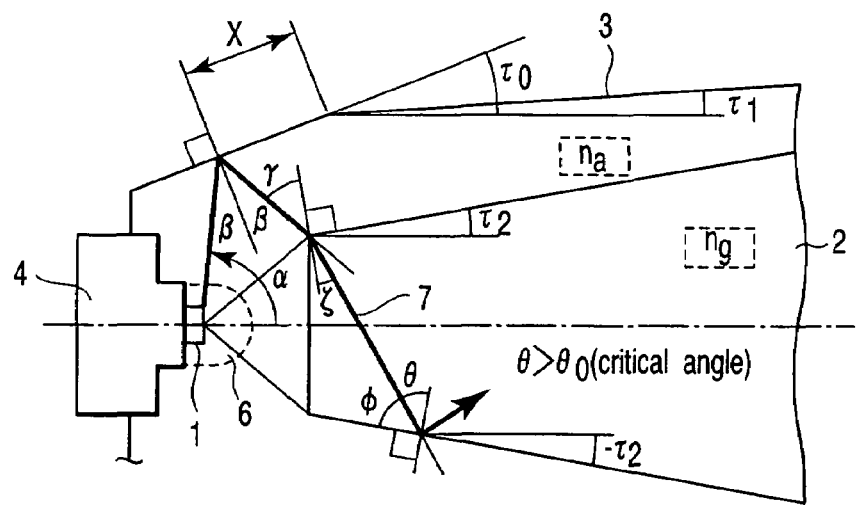
FIG. 6 is an explanatory view showing another example of the setting conditions of the taper gradient.

FIG. 6 is a diagram showing another example of the setting conditions of the taper gradient. FIG. 6 shows a state in a case where the diffusion light emitted by the LED 1 is further diffused at a steep maximum diffusion angle α. Here, a mirror reflection face X is disposed having a gradient angle $\tau_0$ which is lager than a gradient angle $\tau_1$ of the side face of the tapered pipe 3 in such a manner that the diffusion light enters the tapered pipe 3 even in this case. When the gradient angle $\tau_0$ is considered, the setting conditions are as follows:

$$\sin^{-1}\{(n_a/n_g)\cos(-\alpha + 2\tau_0 - \tau_2)\} + 2\tau_2 > \theta_0 \quad (6)'; \text{ and}$$

$$\theta_0 = \sin^{-1}(n_a/n_g) \quad (8)',$$

where $n_a$, $n_g$ denote the absolute refractive indexes of the mediums, and $n_a < n_g$ here.

It is to be noted that $0 < \alpha, \beta, \gamma, \xi, \theta, \tau_0, \tau_1, \tau_2 < \pi/2$, where $\tau_0$, $\tau_1$ denote the gradient angles of the tapered pipe 3, $\tau_2$ denotes the gradient angle of the tapered rod 2, and the angles are determined by a relation with respect to α. Moreover, $\tau_1 < \tau_0$, $\tau_2$ has to be established.

Figure 7:
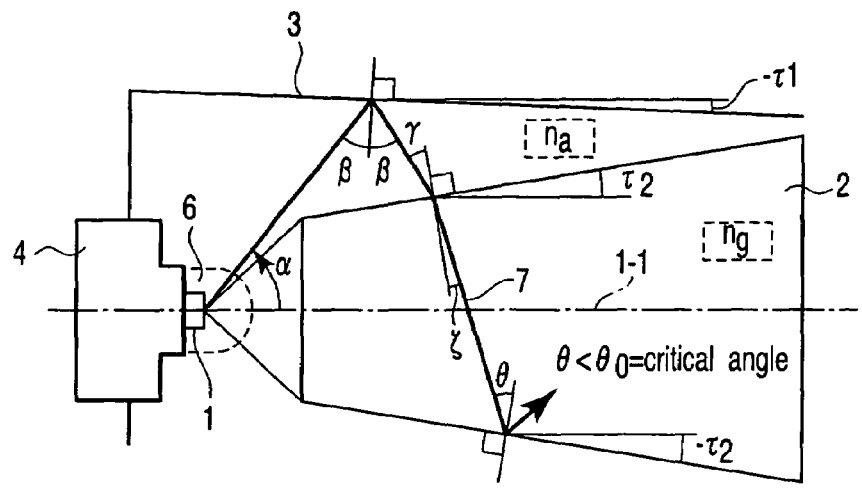
FIG. 7 is a diagram showing a light path of diffusion light 7 in a case where $\tau_1 \leq 0$, $\tau_2 > 0$.

In FIG. 7, the gradient of the tapered rod 2 is positive ($\tau_2 > 0$), but the gradient of the tapered pipe 3 is provided with a negative value ($-\tau_1$), and an inverse taper shape is formed. According to the constitution, it is possible to inhibit Fresnel reflection on the side face of the tapered rod 2.

Figures 8A, 8B:
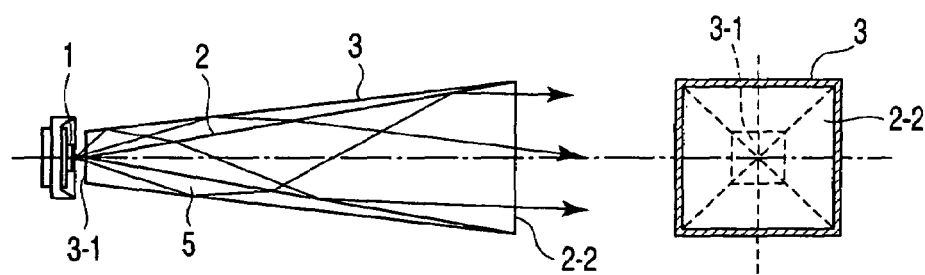
FIGS. 8A, 8B are diagrams showing a second constitution example of the optical NA conversion device which is the light guiding member of the present invention.

FIGS. 8A, 8B are diagrams showing a second constitution example of the optical NA conversion device which is the light guiding member of the present invention. In this constitution example, since the incident end face of the tapered rod 2 is sharpened, the diffusion light emitted from the LED 1 does not directly enter the tapered rod 2. After the light is once reflected by the tapered pipe 3, the light enters the tapered rod 2 from the side face of the rod.

Figures 9A, 9B:
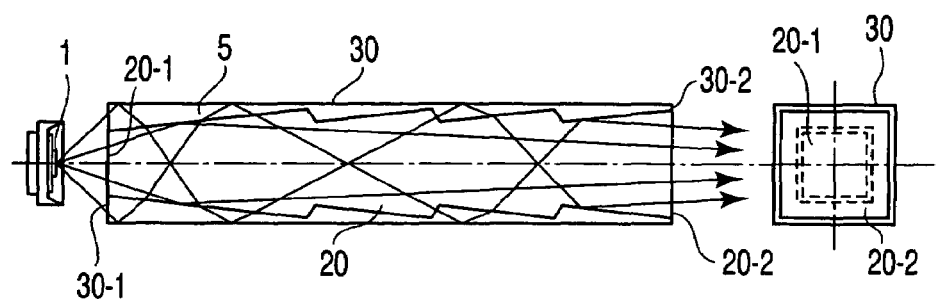
FIGS. 9A, 9B are diagrams showing a third constitution example of the optical NA conversion device which is the light guiding member of the present invention.

FIGS. 9A, 9B are diagrams showing a third constitution example of the optical NA conversion device which is the light guiding member of the present invention. In this constitution example, the optical NA conversion device comprises: a straight pipe 30 used instead of the tapered pipe 3 and having an equal thickness from an incident end face 30-1 to an emissive end face 30-2; and a multistage tapered rod 20 used instead of the tapered rod 2 and having a plurality of stepped portions.

Figures 10A, 10B:
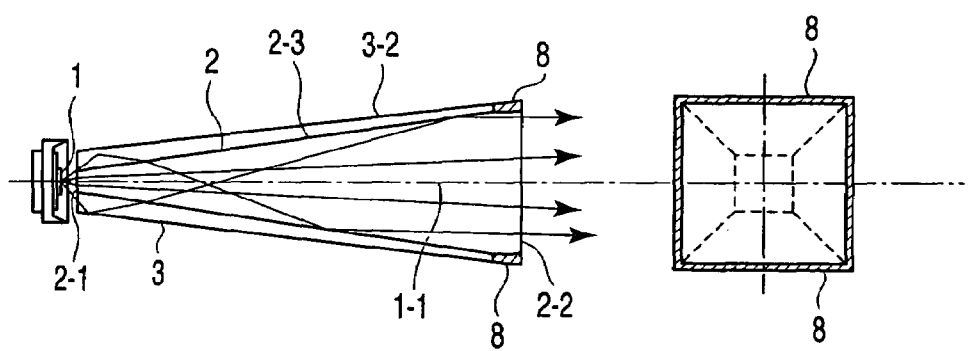
FIGS. 10A, 10B are explanatory views of a taper holding method.

FIG. 10 show explanatory views of a taper holding method. Here, the tapered rod 2 and the tapered pipe 3 are held, when bonding the mirror reflection face 3-2 to the back face of the total reflection face 2-3 by an adhesive 8 around the emissive end face 2-2 of the tapered rod 2. In this constitution, around the emissive end face 2-2 of the tapered rod 2, a distance from the central axis 1-1 to the total reflection face 2-3 is substantially equal to that from the central axis 1-1 to the mirror reflection face 3-2. When the mirror reflection face 3-2 is bonded to the back face of the total reflection face 2-3 by the adhesive 8, adhesion is achieved in a light ray portion having a small NA, and leak light can be reduced.

Figure 11:
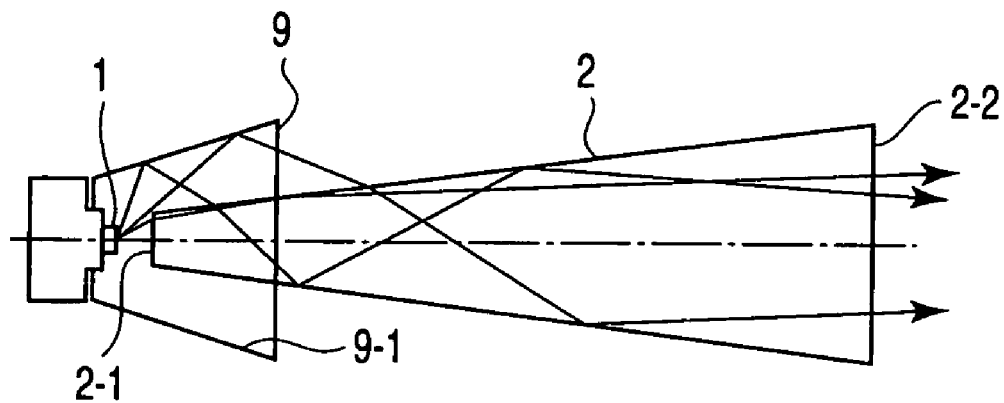
FIG. 11 is a diagram showing a fourth constitution example of the optical NA conversion device which is the light guiding member of the present invention.

FIG. 11 is a diagram showing a fourth constitution example of the optical NA conversion device which is the light guiding member of the present invention. According to the above-described embodiment, for example, the constitution of FIG. 1, after reflecting a part of the diffusion light from the LED 1, the part strikes on the side face in the vicinity of the incident end face 2-1 of the tapered rod 2. To achieve this, the tapered pipe 3 is structured in such a manner that the side face of the tapered rod 2 is substantially surrounded. This structure is effective in a case where the diffusion light once passes through the tapered rod 2, is reflected by the tapered pipe 3, and again enters the tapered rod 2 as in the example shown in FIG. 5. However, an effect can be sufficiently expected, even when the diffusion light is only once reflected by the tapered pipe 3, and thereafter enters the tapered rod 2.

In the constitution of FIG. 11, based on this concept, a reflector 9 which functions as a tapered pipe is fixed to the LED 1 in such a manner as to cover at least the periphery of the incident end face 2-1 of the tapered rod 2. According to this constitution, the diffusion light from the LED 1 is only once reflected by the reflector 9, and enters the tapered rod 2.

To greatly reduce light quantity loss, the inner side face of the reflector 9 is coated with a high-reflectance mirror face. As to a side face shape of the reflector 9, the side face may comprise a flat face as in a polyhedron, or a curved face. This side-face shape, size, and positional relation with respect to the LED can be determined in conformity to the method described with reference to FIGS. 2 to 4.

Figure 12:
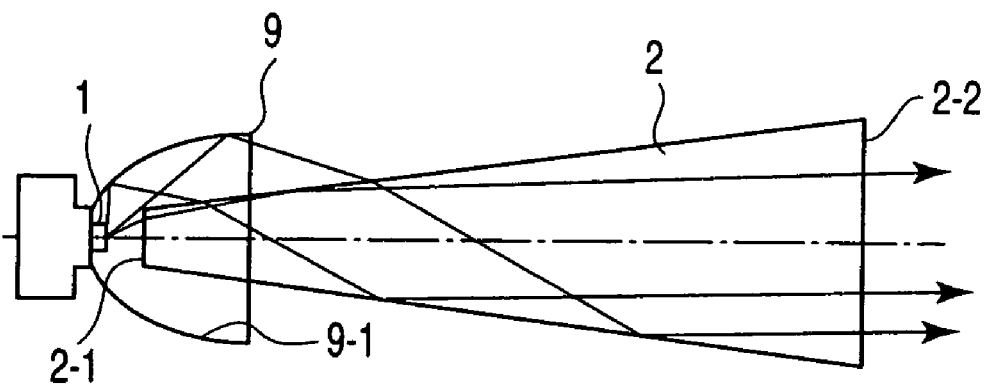
FIG. 12 is a diagram showing a modification of a constitution described with reference to FIG. 11.

FIG. 12 shows a modification of the constitution described with reference to FIG. 11. The modification is characterized in that the reflector 9 is formed into a curved face. When the reflection face of the reflector 9 is formed into an arbitrary curved face, a reflection angle can be controlled in accordance with positions or angles of the light rays which enter the reflector 9. A shape of the constitution can be designed in such a manner that after the reflected light rays strike on the side face of the tapered rod 2, many light rays satisfy total reflection conditions and are guided to the emissive end face 2-2 of the tapered rod 2.

Figures 13A, 13B, 13C:
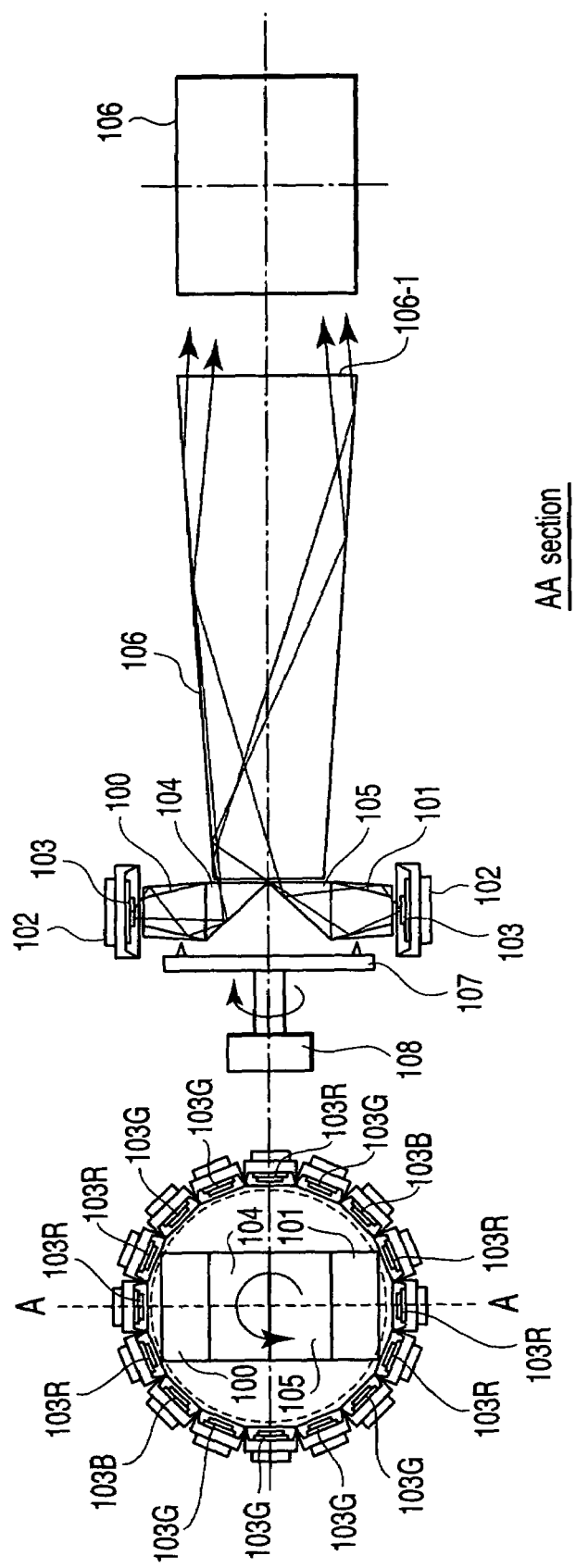
FIGS. 13A, 13B, 13C are diagrams showing an example in which the present optical NA conversion device is applied to a rotary illumination apparatus.

Application examples of the optical NA conversion device of the present invention will be described hereinafter. FIGS. 13A, 13B show an example in which the present optical NA conversion device is applied to a rotary illumination apparatus. By the use of the optical NA conversion device of the present invention, an NA conversion efficiency can be enhanced without enlarging the apparatus.

In an LED light emitting chip 103 for use in the illumination apparatus, in order to realize emission of red (R), green (G), blue (B) light, chips are used as one set including: three LED light emitting chips 103R for R; one LED light emitting chips 103B for B; and four LED light emitting chips 103G for G, and two sets of LED light emitting chips are arranged in a ring form. Inside the ring, an integral movable section is supported by a rod support section 107 rotated by a rotary motor 108, and housed comprising: a set of a double tapered device 100 and a prism 104; and a set of a double tapered device 101 and a prism 105.

While the integral movable section is rotated via the rod support section 107, the respective LED light emitting chips 103R, 103B, 103G are successively switched to emit a light pulse. Therefore, an LED emits light corresponding to the double tapered devices 100, 101 which change with the rotation. The diffusion light from the LED is guided by the double tapered devices 100, 101, and the prisms 104, 105. Thereafter, the light enters a tapered rod 106 disposed adjacent to the integral movable section. The diffusion light travels in the tapered rod 106 while being totally reflected, and the light is emitted from an emissive end 106-1.

Figures 14A, 14B, 14C:
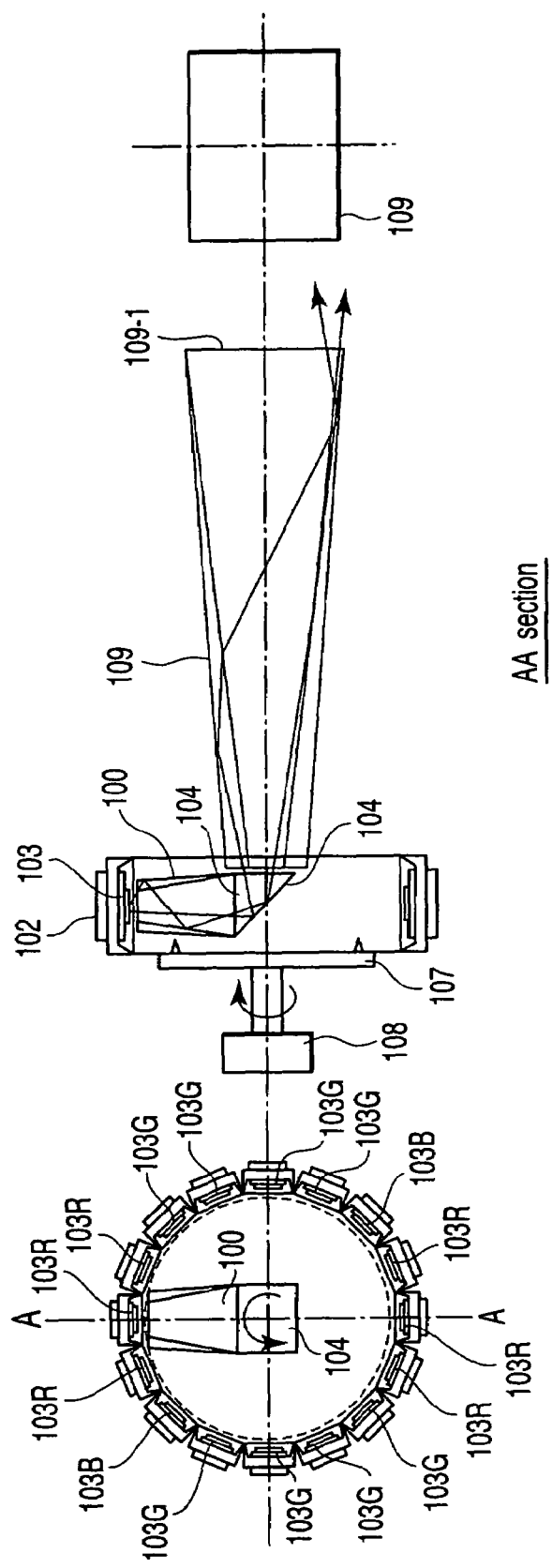
FIGS. 14A, 14B, 14C are diagrams showing another example in which the present optical NA conversion device is applied to the rotary illumination apparatus.

FIGS. 14A, 14B show another example in which the present optical NA conversion device is applied to the rotary illumination apparatus. Here, a movable section comprises only a double tapered device 100 and a prism 104, and a double tapered device 109 is disposed instead of the tapered rod 106 of FIG. 13.

Figure 15:
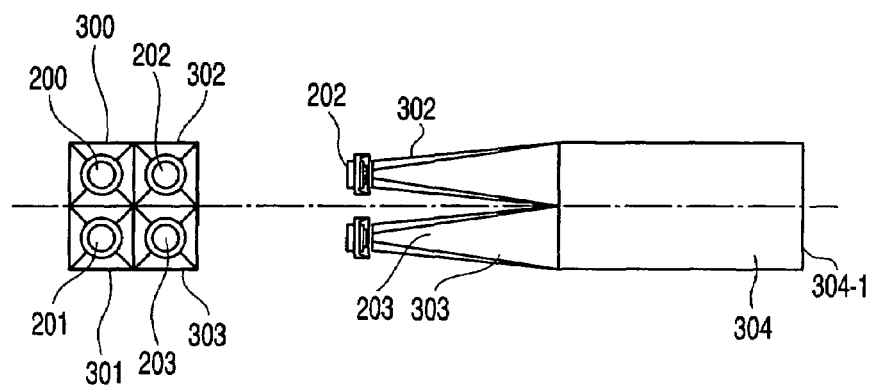
FIG. 15 is a diagram showing an example of the application of the present optical NA conversion device to an illumination apparatus which does not have any rotation section.

FIG. 15 shows an example of the application of the present optical NA conversion device to an illumination apparatus which does not have any rotation section. In this constitution, four LED packages 200 to 203 are arranged in a rectangular form, and four double tapered devices 300 to 303 are arranged as light guiding members adjacent to the respective LED packages 200 to 203. Furthermore, an integrator rod 304 is disposed as space modulating means for uniformly mixing light rays guided from the respective double tapered devices 300 to 303 to emit the light rays from an emissive face 304-1.

Figure 16:
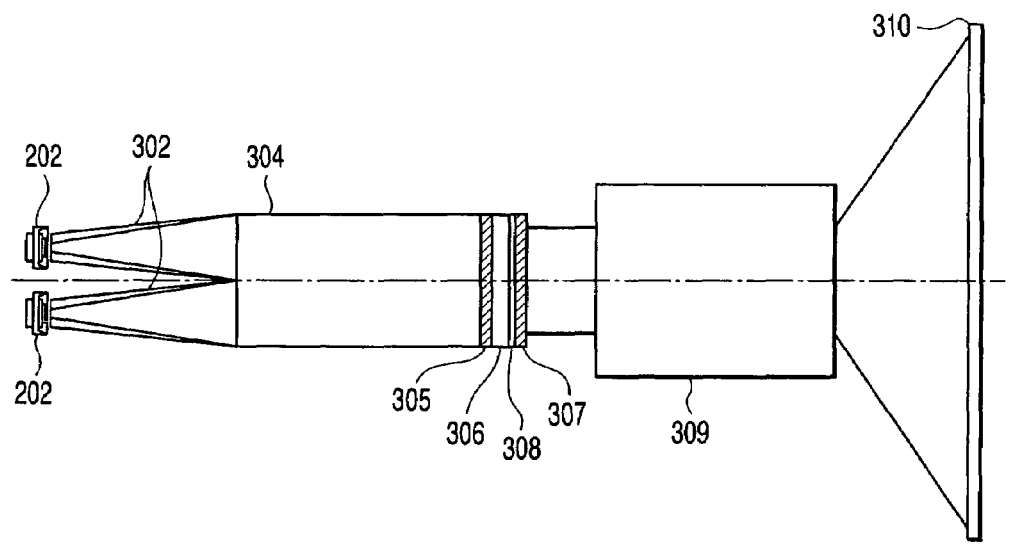
FIG. 16 is a diagram showing an example in which the illumination apparatus described with reference to FIG. 15 is applied to a projector.

FIG. 16 shows an example in which the illumination apparatus described with reference to FIG. 15 is applied to a projector. There are a polarization plate 305, a liquid crystal display device 306, a color mosaic filter 308, and a polarization plate 307 which are arranged in order on an emissive face 304-1 of an integrator rod 304 of the illumination apparatus. Further in a subsequent stage, a projection lens 309 is disposed as optical projecting means in such a manner as to project the light rays on a screen 310. It is to be noted that the liquid crystal display device 306 is different from the color mosaic filter 308, and is monochromatic. An LED successively illuminates faces like R→(G1+G2)→B. The light rays may be modulated in synchronization with the illumination.

Figure 17:
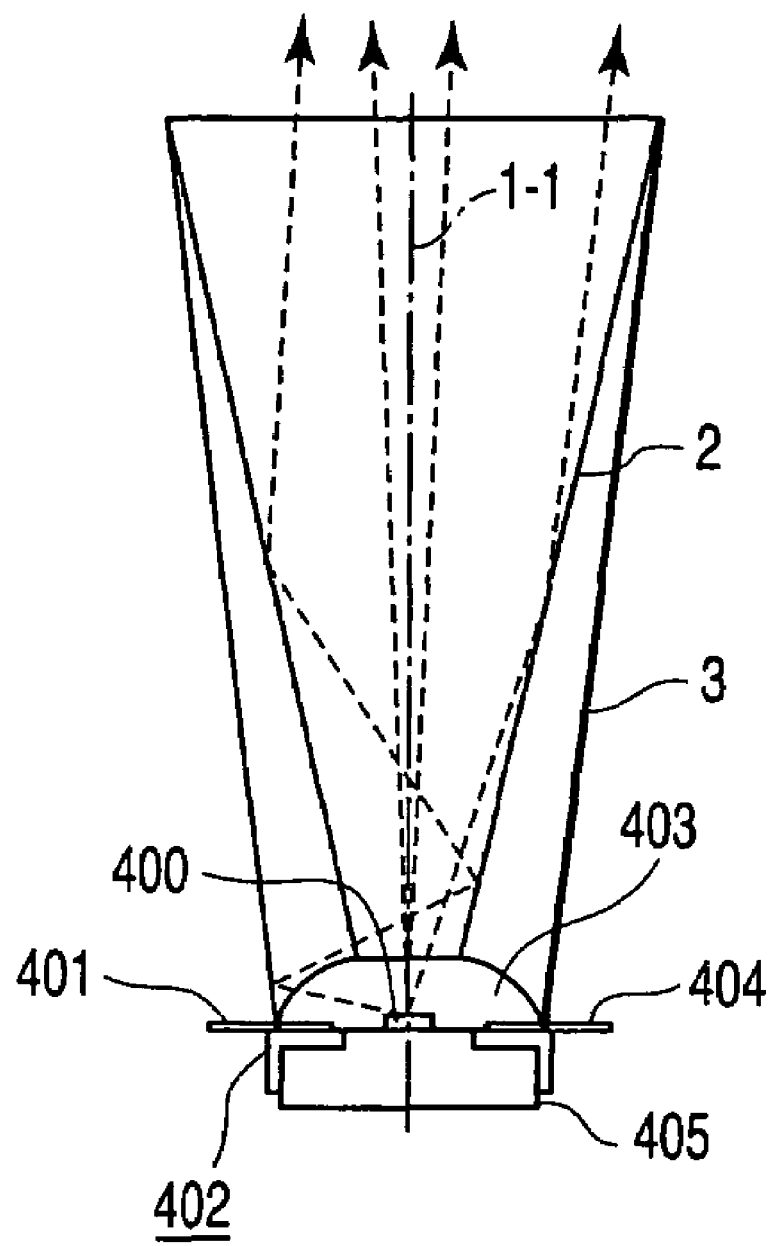
FIG. 17 is a diagram showing an LED package structure which houses the optical NA conversion device of the present invention.

FIG. 17 is a diagram showing an LED package structure to which the optical NA conversion device of the present invention is applied. In an LED package 402, an LED light emitting chip 400, and electrodes 401, 404 are arranged on a thermally conductive block 405. They are sealed by a light guiding resin 403 together with a double tapered device constituted of a tapered rod 2 and a tapered pipe 3. Accordingly, the LED light emitting chip 400 which is a light source is fixed to the tapered rod 2 and the tapered pipe 3. The light guiding resin 403 has a function of guiding the diffusion light emitted by the LED light emitting chip 400 to the incident end face of the tapered rod 2. Here, the tapered pipe 3 is hollow. The tapered rod 2 is solid, and a medium has a refractive index which is larger than that of air. The light guiding resin 403 comprises a silicon-base transparent resin or an epoxy-based transparent resin, and has a refractive index which is substantially equal to that of the medium of the tapered rod 2. A length of the tapered pipe 3 in a direction of the central axis 1-1 is longer than that of the tapered rod 2 in the central axis 1-1 direction.

The above-described embodiment solves a fundamental problem to obtain illuminative light which is superior in condensing and parallel properties and which is very bright. It has heretofore been difficult to solve the problem in a case where a light emitting element is used, such as an LED. Moreover, diffused light can be efficiently taken in.

According to the present invention, it is possible to obtain illuminative light which is superior in condensing and parallel properties and which is very bright, and it is possible to take in the diffused light with good efficiency.

What is claimed is:

1. A light guiding member which guides diffusion light using as a central axis a substantial center of the diffusion light emitted from a light source, the member comprising:
   a tapered rod comprising an incident end face, an emissive end face having an area larger than that of the incident end face, and a total reflection face which guides at least the diffusion light striking on the incident end face to the emissive end face by inner face reflection; and
   a pipe disposed in a position which is farther than a distance from the central axis to the total reflection face and comprising a reflection face or a reflection layer which coats the tapered rod.

2. The light guiding member according to claim 1, wherein the pipe is a tapered pipe comprising a mirror reflection face which coats the tapered rod, and, a distance from the mirror reflection face to the central axis is longer on an emissive end face side than on an incident end face side of the tapered rod,
   a gradient angle $\tau_1$ of the mirror reflection face with respect to the central axis is smaller than a gradient angle $\tau_2$ of the total reflection face with respect to the central axis, and the gradient angles $\tau_1$, $\tau_2$ indicate positive values.

3. The light guiding member according to claim 1, wherein a refractive index $n_g$ of a medium of the tapered rod is larger than a refractive index $n_a$ of a medium of a gap between the pipe and the tapered rod.

4. The light guiding member according to claim 1, wherein a medium of the tapered rod is glass, and a medium of a gap between the pipe and the tapered rod is air.

5. The light guiding member according to claim 1, wherein a medium of the tapered rod is plastic, and a medium of a gap between the pipe and the tapered rod is air.

6. The light guiding member according to claim 2, wherein the distance from the central axis to the total reflection face is substantially equal to that from the central axis to the mirror reflection face at an emissive end face portion of the tapered rod.

7. The light guiding member according to claim 6, wherein the tapered pipe and the tapered rod are held by an adhesive which bonds the mirror reflection face and a back face of the total reflection face in the emissive end face portion of the tapered rod.

8. The light guiding member according to claim 1, wherein the reflection face or the reflection layer of the pipe is constituted to cover at least an incident end face portion periphery of the tapered rod.

9. The light guiding member according to claim 1, wherein a length of the pipe in a direction of the central axis is longer than that of the tapered rod in the central axis direction.

10. The light guiding member according to claim 2, wherein values are set to:
   the gradient angle $\tau_1$ of the mirror reflection face with respect to the central axis;
   the gradient angle $\tau_2$ of the total reflection face with respect to the central axis;
   a maximum diffusion angle $\alpha$ from the central axis at a time when emitting from the light source the diffusion light guided to the emissive end face; and
   an area $S_i$ of the incident end face of the tapered rod in such a manner as to satisfy: a demanded value of the maximum diffusion angle $\alpha$ from the central axis of the diffusion light emitted from the emissive end face of the tapered rod; and
   a demanded value of an area $S_o$ of the emissive end face of the tapperd rod.

11. The light guiding member according to claim 10, wherein during the setting, the respective values are set in such a manner as to satisfy the following condition formulas:

$$\sin^{-1}\{(n_a/n_g)\cos(-\alpha+2\tau_1-\tau_2)\}+2\tau_2>\theta_0; \text{ and}$$

$$\theta_0=\sin^{-1}(n_a/n_g),$$

where $n_a<n_g$, $0<\alpha$, $\tau_1$, $\tau_2<\pi/2$, $\tau_1<\tau_2$, and $\theta_0$ denotes a critical angle.

12. The light guiding member according to claim 10, further comprising: a mirror reflection face having a gradient angle $\tau_0$ larger than the gradient angle $\tau_1$ only in a region which the diffusion light enters that has been emitted from the light source at the maximum diffusion angle $\alpha$ from the central axis.

13. An illumination apparatus using the light guiding member according to claim 1, the apparatus comprising:
   a light source which emits diffusion light striking on at least the incident end face of the tapered rod; and
   holding means for fixing the light source with respect to the tapered rod and/or the pipe.

14. An illumination apparatus using the light guiding member according to claim 1, the apparatus comprising:
   a light source which emits diffusion light striking on at least the incident end face of the tapered rod; and
   holding means for fixing the light source with respect to the pipe,
   the pipe being constituted as reflector of the light source.

15. The illumination apparatus according to claim 13, wherein the light source is a light emitting element of an LED.

16. The illumination apparatus according to claim 1, wherein the diffusion light inner-face reflected by the total reflection face of the tapered rod and guided to the emissive end face includes not only the diffusion light which has exited from the light source and which has thereafter directly entered the tapered rod but also the diffusion light which has exited from the light source and which has thereafter been reflected by the mirror reflection face and which has entered the tapered rod.

17. The illumination apparatus according to claim 1, wherein the diffusion light inner-face reflected by the total reflection face of the tapered rod and guided to the emissive end face includes not only the diffusion light which has exited from the light source and which has entered the incident end face but also diffusion light which has exited from the light source and which has entered the tapered rod from a side face of the tapered rod.

18. The illumination apparatus according to claim 2, wherein in the reflection face or the reflection layer of the pipe, the gradient angle $\theta_1$ of the reflection face or the reflection layer is set in such a manner that reflected light obtained by reflecting the diffusion light emitted by the light source strikes on the incident end face and/or the side face of the tapered rod at an angle at which the reflected light is reflected by the inner face of the tapered rod and guided to the emissive end face.

19. The illumination apparatus according to claim 1, wherein as to the reflection face or the reflection layer of the pipe, which reflects the reflecting light striking on the side face of the tapered rod, the gradient angle τ1 of the reflection face with respect to central axis indicates a negative value in such a manner as to inhibit Fresnel reflection on the side face.

20. An illumination apparatus comprising:
a light source section with emits diffusion light;
a tapered rod which guides the diffusion light using as a central axis a substantial center of the diffusion light emitted by the light source section; and
a pipe comprising a reflection face or a reflection layer which coats the tapered rod,
the tapered rod comprising:
an incident end face on which the diffusion light emitted by the light source strikes;
an emissive end face having an area larger than that of the incident end face; and
a total reflection face which guides at least the diffusion light striking on the incident end face to the emissive end face by inner face reflection,
the pipe comprising:
the reflection face or the reflection layer disposed in a position which is farther than a distance from the central axis to the total reflection face,
the light source section comprising:
a light emitting element which emits the diffusion light; and
a light guiding element which guides the diffusion light emitted by the light emitting element to at least the incident end face.

21. The illumination apparatus according to claim 20, wherein a refractive index of a medium constituting the light guiding element is substantially equal to that of a medium constituting the tapered rod.

22. The illumination apparatus according to claim 20, wherein a material constituting the light guiding element is a silicon-based transparent resin.

23. The illumination apparatus according to claim 20, wherein a material constituting the light guiding element is an epoxy-based transparent resin.

24. A projector using the illumination apparatus according to claim 13, further comprising:
space modulating means for modulating illuminative light which has exited from the emissive end face of the tapered rod in accordance with input video information; and
optical projecting means for projecting the illuminative light modulated by the space modulating means.

25. A projector using the illumination apparatus according to claim 14, further comprising:
space modulating means for modulating illuminative light which has exited from the emissive end face of the tapered rod in accordance with input video information; and
optical projecting means for projecting the illuminative light modulated by the space modulating means.

26. A projector using the illumination apparatus according to claim 20, further comprising:
space modulating means for modulating illuminative light which has exited from the emissive end face of the tapered rod in accordance with input video information; and
optical projecting means for projecting the illuminative light modulated by the space modulating means.

27. The illumination apparatus according to claim 14, wherein the light source is a light emitting element of an LED.

* * * * *